United States Patent [19]

Junker

[11] Patent Number: 5,532,445
[45] Date of Patent: Jul. 2, 1996

[54] APPARATUS AND PROCESS FOR THE LONGITUDINAL-SIDE WELDING OF TUBES TO FLAT STEEL BARS

[75] Inventor: Peter Junker, Oberembrach, Switzerland

[73] Assignee: ABB Management AG, Baden, Switzerland

[21] Appl. No.: 388,513

[22] Filed: Feb. 14, 1995

[30] Foreign Application Priority Data

Feb. 14, 1994 [EP] European Pat. Off. ............ 94102208

[51] Int. Cl.⁶ .................................................. B23K 9/18
[52] U.S. Cl. ........................... 219/61; 219/73; 219/125.1; 219/137 R
[58] Field of Search ................................. 219/61, 125.1, 219/125.11, 137 R, 73

[56] References Cited

U.S. PATENT DOCUMENTS

| | | | |
|---|---|---|---|
| 2,911,517 | 11/1959 | Armstrong | 219/137 R |
| 2,993,983 | 7/1961 | Carpenter et al. | 219/124.31 |
| 3,045,340 | 7/1962 | Kolling | 219/137 R |
| 3,258,577 | 6/1966 | Smith | 219/137 R |
| 3,342,973 | 9/1967 | Smith et al. | 219/137 R |
| 3,964,665 | 6/1976 | Cervenka et al. | 228/44.3 |
| 4,798,321 | 1/1989 | Moran | 228/183 |

FOREIGN PATENT DOCUMENTS

| | | |
|---|---|---|
| 0167390 | 1/1986 | European Pat. Off. . |
| 2640270 | 5/1977 | Germany . |
| 3425225C2 | 10/1987 | Germany . |
| 3430349C2 | 12/1988 | Germany . |
| 1-205870 | 8/1984 | Japan .................. 219/137 R |
| 59-169678 | 9/1984 | Japan .................. 219/137 R |

*Primary Examiner*—Clifford C. Shaw
*Attorney, Agent, or Firm*—Burns, Doane, Swecker & Mathis

[57] ABSTRACT

In a process and an apparatus for the longitudinal-side welding of tubes (1) to flat steel bars (2), in which the welding in each case is carried out on the top side and on the underside of the flat steel bars (2), the welding torches (4) are arranged in a fixed position, the parts (1, 2) to be joined are pressed against one another before the welding and are moved in the longitudinal direction by means of a conventional transport device (10) during the welding operation, and the welding is carried out on the top side in a known manner by means of a SAW process, combined pulse oscillation GMAW is carried out on the underside at the same time as the SAW carried out on the top side, during which pulse oscillation GMAW the torches (11) are set in very rapid lateral motion by means of an oscillation device (15), the oscillating speed for guiding the welding torches (11) being coordinated with the feed rate of the parts (1, 2) to be welded.

15 Claims, 2 Drawing Sheets

APPARATUS AND PROCESS FOR THE LONGITUDINAL-SIDE WELDING OF TUBES TO FLAT STEEL BARS

BACKGROUND OF THE INVENTION

1. Field of the Invention

The invention relates to an apparatus and a process for the longitudinal-side welding of tubes to flat steel bars, which serve to produce gas-tight tube walls for industrial and power-station boiler plant.

2. Discussion of Background

To produce industrial and power-station boiler plants, thousands of meters of welded joints have to be made between the boiler wall tubes and flat steel bars arranged in between. These so-called tube walls form a large part of industrial or power-station boilers.

It is known that the submerged-arc welding (SAW) process in particular is used to weld such tube walls. The SAW process has the advantage that the arc burns in a stabilized manner and free of spatter under a powder layer, which at the same time assumes the function of providing protection against harmful atmosphere and deoxidation and of forming a slag for the satisfactory metallurgical course of the process. The process is distinguished by high deposition efficiency and a low frequency of defects. However, it has the disadvantage that welding can normally only be carried out in the so-called gravity position, i.e. in the horizontal plane.

This means that hitherto welding always had to be carried out in two passes during the welding of the boiler tube walls, for the quality requirements call for substantial through-welding between tube and flat steel bar. In this arrangement, the welding head is fixed and the parts to be joined are moved.

The joints are thus welded first of all on both sides from above in a first pass. Then the parts to be welded to one another are turned and finish-welded at the remaining two sides in a second pass. But this fact necessitates a relatively high proportion of handling and welding time in the entire fabrication process. Since the possibilities of increasing the welding speed have in the meantime been exhausted, only the use of another welding process is suitable for accelerating the entire process.

Overhead SAW processes (DE 26 40 270, DE 34 25 225, DE 34 30 349) are certainly also known, in which the weld pool, in comparison with "normal" SAW, has been turned as it were through 180° and the welding powder and the electrode are supplied to the welding point from bottom to top. The welding powder has to be forcibly pressed there against the welding point. The main difficulty in overhead SAW consists in guaranteeing the formation of a sound weld, since the weld pool has to be held in suspension, which leads to the instability of the characteristics of the weld pool. The quality of the weld in this process is therefore often not as high as it ought to be according to the demands made on boiler plant. This is because welding with relatively high welding parameters is necessary here to achieve the specified penetration depth. A combination of the weld-pool and powder-supply devices is not possible at the given spatial relationships for the welding of the tube wall.

The gas metal-arc welding (GMAW) process has also been known for years for many applications, and it has been possible in recent years to make marked improvements to the process by means of electronics and through the use of new shielding gases. It is nowadays possible to synergetically control the transfer of droplets by pulsed arc, the result of which is that the weld pool can be readily controlled and modelled. Welding of the tube walls by GMAW therefore likewise appears possible. But this process has not gained acceptance hitherto for the welding of tube walls, since the SAW process is easier to manipulate for this purpose and, inter alia, additional protective measures, e.g. against the dazzling arc in the GMAW process, are not necessary in the SAW process.

To guide the welding torches in various welding processes, the use of oscillation units is known with which it is possible to widen the weld pool and thus bridge irregularities in the groove spacing and produce a weld of good quality. A disadvantage is that the conventional oscillation units on the market work relatively slowly.

SUMMARY OF THE INVENTION

Accordingly, one object of the invention, in attempting to avoid all these advantages, is to provide a novel process and a novel apparatus for the longitudinal-side welding of tubes to flat steel bars to form tube walls, with which it is possible, with a marked time saving compared with the prior art, to automatically make both the top and bottom welds with excellent quality, in which case recourse is to be had largely to the known SAW process.

According to the invention, this is achieved by combined oscillation GMAW being carried out on the underside at the same time as SAW is carried out in a known manner on the top side, during which oscillation GMAW the torches are set in lateral motion by means of an oscillation device, and the oscillating speed for guiding the welding torches is coordinated with the feed rate of the parts to be welded.

According to the invention, in an apparatus for carrying out the process, in which apparatus an automatic SAW device, having at least one pair of fixed welding torches, means for feeding and guiding the welding wire and means for supplying and discharging the welding powder for making the welds on the top side, as well as a transport device for pressing and transporting the parts to be welded during the welding operation are arranged essentially in a machine column, this is achieved by at least one combined pulse oscillation GMAW device having a pair of torches for simultaneously making the welds on the underside being arranged in the machine column underneath the parts to be welded, in which case the GMAW torches are arranged at a certain longitudinal distance from the SAW torches, can be easily set in lateral motion by the oscillation device and are at an adjustable angle of inclination.

The advantages of the invention can be seen, inter alia, in the fact that the boiler tube walls can be welded in a single operation, i.e. from above as well as simultaneously from below (overhead position). Consequently, an enormous time saving occurs, for the fabrication process is shortened by about 50 to 60%. The process runs largely automatically and is therefore especially economical.

It is advantageous if the magnitude of the feed rate is selected as a function of the tube wall thickness in such a way that no additional cooling is necessary.

In addition, it is convenient if work is carried out with a feed rate in the range of 1.1 m/min to 1.5 m/min, preferably 1.3 m/min. Consequently, no additional cooling is necessary, scale does not form on the flat steel bar and the process is very effective from the point of view of the time required.

It is especially convenient if an oscillating motion is performed at least every 2 mm of feed during the pulse oscillation GMAW. The weld pool is sufficiently widened by this exceptionally quick oscillation so that inaccuracies during the tube fabrication are compensated for and a sensor-controlled torch arrangement can be dispensed with.

Furthermore, it is advantageous if the welding parameters are selected in such a way that the non-through-welded thickness of the flat steel bar is at most 0.3 times the thickness of the flat steel bar, and that the sum of the weld thicknesses on the top side and on the underside is in each case at least 1.25 times the thickness of the flat steel bar, and the thickness of the tube material which has not melted is at least 2 mm.

Finally, an apparatus is advantageously used in which the longitudinal distance between SAW and GMAW torches is about 320 mm. Consequently, no adverse interaction between the two welding processes takes place.

The angle of inclination α between the center line of the GMAW torch and the vertical is advantageously 27° to 30°.

Furthermore, it is convenient if, for reasons of cost, only one common oscillation device is present on the two GMAW torches, although an oscillation device can of course also be arranged on each GMAW torch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. Elements of the system which are not shown are, for example, the current feed, the torch fastening and the control units.

DESCRIPTION OF THE PREFERRED EMBODIMENTS

Figure 1:
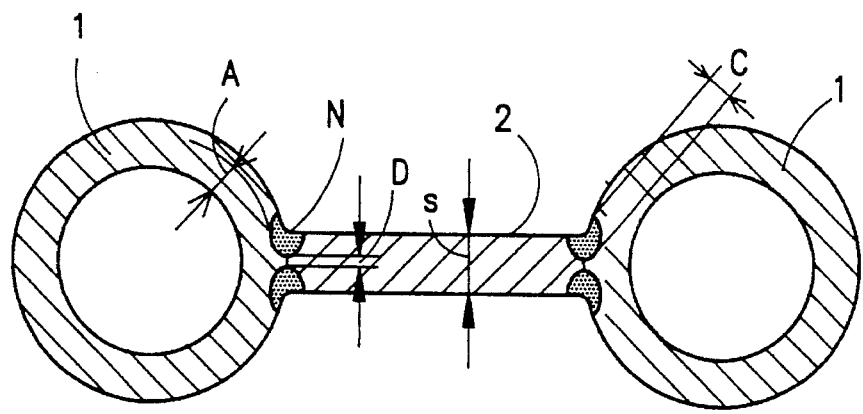
FIG. 1 shows a cross section of the finish-welded joint between the flat steel bar and two tubes.

Referring now to the drawings, wherein like reference numerals designate identical or corresponding parts throughout the several views, the welded joint shown in FIG. 1 is to be made with the least possible outlay by the process according to the invention. For the fabrication of gas-tight boiler-tube walls, the tubes 1 have to be welded to flat steel bars 2 arranged in between. Here, two welds N are to be made on each side on both the top side and the underside of the flat steel bar 2, that is, a total of four welds N, the top welds being designated by N1 and N2 and the bottom welds being designated by N3 and N4.

Figure 2:
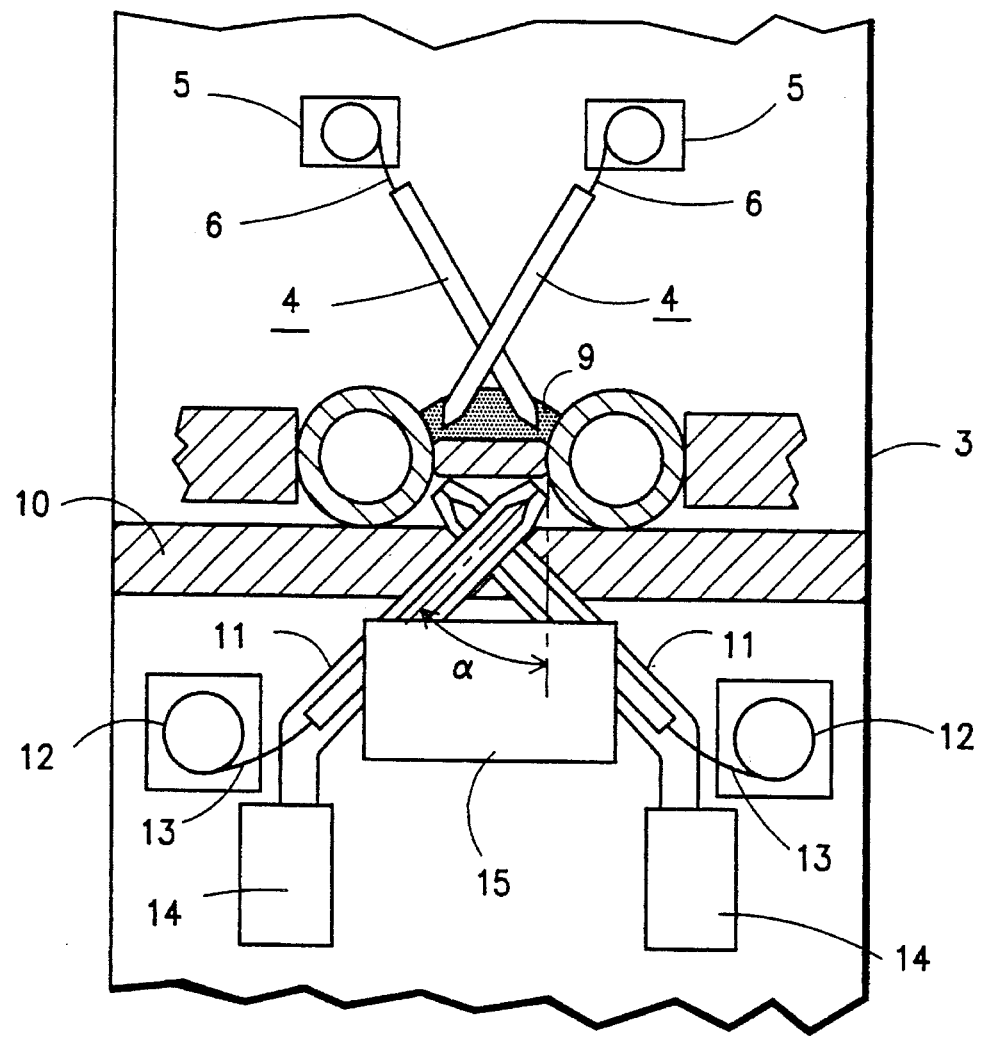
FIG. 2 shows a cross section through the essential parts of the apparatus according to the invention in the plane of the SAW torch, the GMAW torch in front of it also being shown for better understanding of the entire arrangement.
Figure 3:
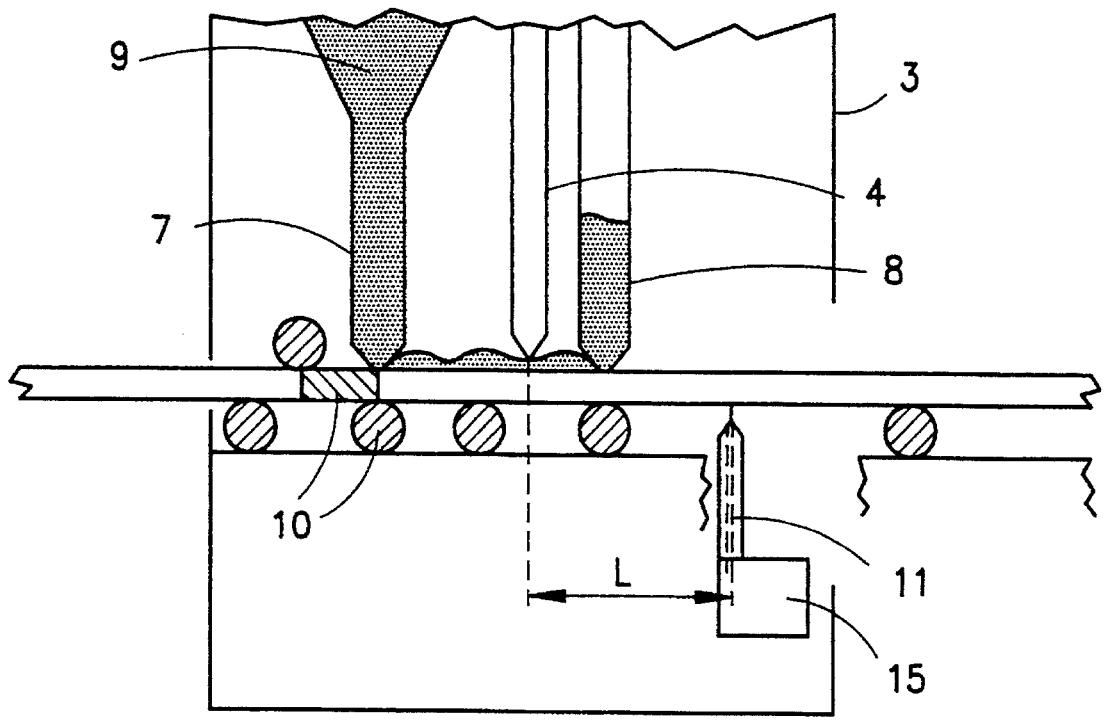
FIG. 3 shows a partial longitudinal section of the apparatus and of the metal parts to be welded in the plane of two welds lying one above the other.

FIGS. 2 and 3 show in a simplified form the making of the welded joints. A conventional automatic SAW machine is used to produce the top welds N1 and N2. Arranged in the machine column 3 are two fixed SAW torches 4 having means 5 for feeding and guiding the welding wire 6 and means for supplying 7 and means for discharging 8 the welding powder 9 for making the welds N1 and N2 on the top side as well as a transport device 10 for pressing and transporting the parts 1, 2 to be welded during the welding operation. Arranged under the parts 1, 2 to be welded in the machine column 3 is a combined pulse oscillation GMAW device having two torches 11, means 12 for feeding and guiding the GMAW wire 13 and means 14 for supplying the shielding gas for the purpose of making the welds N3 and N4 simultaneously on the underside. In this arrangement, the GMAW torches 11 are at a certain longitudinal distance L from the SAW torches 4, can be easily set in lateral motion by the oscillation device 15 and are at an adjustable angle of inclination α between the center line of the torch 11 and the vertical. The longitudinal distance L between the SAW torches 4 and the GMAW torches 11 is about 320 mm and the angle of inclination α is 27°. Attached to both GMAW torches 11 is a common oscillation device 15 which sets the torches 11 in a lateral oscillating motion. An oscillation device 15 can of course also be arranged on each torch 11 in another exemplary embodiment. In addition, it is also possible in other exemplary embodiments to arrange a plurality of SAW torches (4) and GMAW torches (11) one behind the other, in each case in pairs.

The process according to the invention is described in more detail with reference to the longitudinal-side welding of tubes of St 35.8/T having a diameter of 60.3 mm and a wall thickness of 4.5 mm to a flat steel bar of St 37-2 having a width of 19.7 mm and a thickness S of 6.0 mm by means of the apparatus described above for the purpose of producing a boiler tube wall. The parts 1, 2 to be joined are supplied to the welding torches 4 and pressed against one another by means of the transport device 10. The top welds N1 and N2 are made by means of the known SAW process, in which case a SAW wire 6 of type EMS 3 Mo having a diameter of 2.5 mm and commercially available SAW powder 9 are used. At the same time, the bottom welds N3 and N4 are made by means of combined pulse oscillation GMAW. Carbofil 100 having a diameter of 1.6 mm is used as GMAW wire 13. A mixture of 82% argon and 18% carbon dioxide is used as shielding gas. The welding speed for the tube wall, i.e. the feed rate, is 1.3 m/min. This ensures that the heat dissipation is sufficiently large and no additional cooling is necessary. The oscillation speed is coordinated with the feed rate. An oscillating motion takes place every 2 mm of feed. The weld pool is sufficiently widened by this exceptionally fast oscillation so that inaccuracies during the tube fabrication are compensated for and a sensor-controlled torch arrangement can be dispensed with.

The welding parameters are selected in such a way that the non-through-welded thickness D of the flat steel bar 2 is at most 0.3 times the thickness S of the flat steel bar 2, and that the sum of the weld thicknesses on the top side and underside C1+C2 and C3+C4 respectively is in each case at least 1.25 times the thickness S of the flat steel bar 2, and the thickness of the tube material A which has not melted is at least 2 mm. In the exemplary embodiment selected, work is therefore carried out with the following welding parameters of the pulse GMAW torch: the torch 11 which is at a slightly smaller distance from the SAW torch 4 works with a voltage of 23 V and a current intensity of 298 A at a wire feed rate of 5 m/min, while the second torch 11 is operated at a voltage of 21.5 V and a current intensity of 297 A at a wire feed of 4.5 m/min.

The fabrication process can be shortened by about 50 to 60% by the welding of the boiler tube walls in a single pass, i.e. the simultaneous automatic welding from above and below. This leads to a significant cost saving compared with the prior art.

The welds are of very good quality and meet the stringent requirements of boiler construction.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for longitudinal welding of a tube to a flat steel bar comprising:

positioning submerged-arc welding torches in a fixed position;

connecting a gas metal-arc welding torch to an oscillator;

pressing the tube and the flat steel bar to be joined against one another and passing the tube and the flat steel bar between the submerged-arc welding torches and the gas metal-arc welding torch;

welding a top side of the tube and flat steel bar together by submerged-arc welding;

welding an underside of the tube and flat steel bar together by combined pulse oscillation gas metal-arc welding while welding the top side; and moving the tube and the flat steel bar in a longitudinal direction during welding by a transport device.

2. The process as claimed in claim 1, wherein welding is carried out with a feed rate in the range of 1.1 to 1.5 m/min.

3. The process as claimed in claim 2, wherein welding is carried out with a feed rate of 1.3 m/min.

4. The process as claimed in claim 1, wherein an oscillating motion of the gas metal-arc welding torch is performed at least one time for every 2 mm of tube which passes the torch.

5. The process as claimed in claim 1, wherein welding parameters are selected in such a way that a non-through-welded thickness of the flat steel bar is at most 0.3 times a thickness of the flat steel bar, and that a sum of weld thicknesses on the top side and underside is at least 1.25 times the thickness of the flat steel bar, and a thickness of the tube material which has not melted is at least 2 mm.

6. The process as claimed in claim 1, wherein an oscillating speed of the gas metal-arc welding torch is coordinated with a magnitude of a feed rate of the transport device.

7. The process as claimed in claim 6, wherein the magnitude of the feed rate is selected as a function of a tube wall thickness.

8. An apparatus for longitudinal-side welding of tubes to a flat steel bar comprising:

an automatic submerged-arc welding device having at least one pair of fixed welding torches, means for feeding a guiding welding wire, and means for supplying and discharging submerged-arc welding powder for making upper welds on a top side of the tubes and flat steel bar to be welded;

at least one combined pulse oscillation gas metal-arc welding device having a pair of torches for simultaneously making lower welds on an underside of the tubes and flat steel bar to be welded; and a transporting device for pressing and transporting the tubes and flat steel bar to be welded during a welding operation.

9. The apparatus as claimed in claim 8, wherein a common oscillation device is arranged on the two gas metal-arc welding torches.

10. The apparatus as claimed in claim 8, wherein an oscillation device is arranged on each gas metal-arc welding torch.

11. The apparatus as claimed in claim 8, wherein the automatic submerged-arc welding device and the combined pulse oscillation gas metal-arc welding device are arranged in a machine column.

12. The apparatus as claimed in claim 11, wherein the pair of torches of the gas metal-arc welding device have an adjustable inclination angle between axes of the torches and a vertical.

13. The apparatus as claimed in claim 12, wherein the angle of inclination of the gas metal-arc welding torches is about 27° to 30°.

14. The apparatus as claimed in claim 11, wherein the pair of torches of the gas metal-arc welding device are arranged at a predetermined longitudinal distance from the pair of torches of the submerged-arc welding device.

15. The apparatus as claimed in claim 14, wherein the longitudinal distance between the submerged-arc welding torches and the gas metal-arc welding torches is about 320 mm.

* * * * *